United States Patent [19]
DiLeo

[11] Patent Number: 5,968,600
[45] Date of Patent: Oct. 19, 1999

[54] EMI/RFI-SHIELDING COATING

[75] Inventor: Derek A. DiLeo, Lafayette, Ind.

[73] Assignee: Egyptian Lacquer Mfg. Co., Lafayette, Ind.

[21] Appl. No.: 08/986,223

[22] Filed: Dec. 5, 1997

Related U.S. Application Data

[63] Continuation-in-part of application No. 08/529,090, Sep. 15, 1995, Pat. No. 5,696,196.

[51] Int. Cl.$^6$ ............................... B05D 5/12; B05D 7/02
[52] U.S. Cl. ....................... 427/393.5; 427/386; 427/387; 427/393.1; 427/180
[58] Field of Search ..................... 427/386, 387, 427/393.5, 397.7, 180, 393.1, 201, 205

[56] References Cited

U.S. PATENT DOCUMENTS

| | | | |
|---|---|---|---|
| 3,586,478 | 6/1971 | Neumann . | |
| 4,305,847 | 12/1981 | Stoetzer et al. | 252/512 |
| 4,382,981 | 5/1983 | Stoetzer et al. | 427/105 |
| 4,517,118 | 5/1985 | Stoetzer | 252/513 |
| 4,518,524 | 5/1985 | Stoetzer | 252/514 |
| 4,556,506 | 12/1985 | Friedli et al. | 252/512 |
| 4,578,310 | 3/1986 | Hatfield | 427/456 |
| 4,582,729 | 4/1986 | Tsiamis et al. | 427/306 |
| 4,652,465 | 3/1987 | Koto et al. | 427/216 |
| 4,663,240 | 5/1987 | Hadju et al. | 427/123 |
| 4,716,081 | 12/1987 | Ehrreich | 428/403 |
| 4,739,003 | 4/1988 | Barr et al. | 524/446 |
| 4,826,631 | 5/1989 | Sullivan | 252/512 |
| 4,909,901 | 3/1990 | McAllister et al. | 162/125 |
| 4,950,423 | 8/1990 | Sullivan | 252/512 |
| 4,978,708 | 12/1990 | Fowler et al. | 524/507 |
| 5,011,881 | 4/1991 | Fujii et al. | 524/457 |
| 5,118,747 | 6/1992 | Pollart et al. | 524/424 |
| 5,180,513 | 1/1993 | Durand | 252/62.55 |
| 5,204,401 | 4/1993 | Anderson, Jr. et al. | 524/441 |
| 5,240,777 | 8/1993 | Wacher | 428/454 |
| 5,252,632 | 10/1993 | Savin | 523/137 |
| 5,266,109 | 11/1993 | Voelker et al. | 106/459 |
| 5,360,643 | 11/1994 | Wacher | 427/402 |
| 5,490,893 | 2/1996 | Enlow et al. | 156/230 |
| 5,514,466 | 5/1996 | Yamada et al. | 428/328 |
| 5,696,196 | 12/1997 | DiLeo | 524/445 |
| 5,766,739 | 6/1998 | Funaki et al. | 427/387 |

Primary Examiner—Diana Dudash
Attorney, Agent, or Firm—Woodard, Emhardt, Naughton, Moriarty & McNett

[57] ABSTRACT

An EMI/RFI shielding coating composition and method of using to produce a coating with good cohesion and a resistance of less than 1.0 ohms/square at a coating thickness of less than 1.5 mils includes:

(a) between about 7% and about 65% by weight of a thermoplastic aqueous emulsion;

(b) between about 1.5% and 10% by weight of an aqueous urethane, alkyd, epoxy, polyester, or vinyl dispersion;

(c) between about 0.1% and 5% by weight of a glycol, alcohol, ketone, ester, aromatic or aliphatic coalescing solvent;

d) between about 0.1% and about 5.0% by weight of conductive clay or silica;

e) between about 0.01% and about 5.0% by weight of a polyacrylate resin;

f) particles of conductive metal such as copper, silver, nickel or gold, or mixtures thereof;

g) one or more defoaming agents; and h) water.

6 Claims, No Drawings

ID, 5,968,600

EMI/RFI-SHIELDING COATING

This application is a continuation-in-part of U.S. patent Application Ser. No. 08/529,090 filed Sep. 15, 1995, now U.S. Pat. No. 5,696,196 issued on Dec. 9, 1997.

FIELD OF THE INVENTION

The present invention relates generally to aqueous coating compositions, and more particularly to an aqueous, spray-on coating effective for imparting electromagnetic interference- and radio frequency interference-shielding properties to molded plastics.

BACKGROUND TO THE INVENTION

The need to shield electronic components from electromagnetic interference ("EMI") and radio frequency interference ("RFI") is well known. While traditional metal cabinets provide an effective shield against this interference, plastic housings permit EMI and RFI waves to pass through. Sensitive electrical components must therefore be housed in metal housings or the plastic housing must be coated with a thin layer of metal to shield against interference.

A variety of methods are known for coating a thin layer of metal onto plastics to make them shield against EMI and/or RFI. One such method is plastic plating, although that method has proven to be expensive, environmentally undesirable, and inconsistent. Vacuum metallizing is another alternative, but that method is unsuitable for volume production of electronic enclosures. The incorporation of metallic fiber into the plastic itself is another method with some promise, but that method remains experimental and expensive and unavailable for widespread use.

The most preferred method of coating metal onto plastic is by spray painting. In particular, spray paints with metal particles (including, e.g., metal powders and flakes) suspended in the paint may be advantageously used. The metal particles are commonly nickel or copper, although silver or some other electrically conductive metal may be used.

Nickel-based EMI-shielding and RFI-shielding coatings were the first to be developed. Although those coatings are relatively inexpensive to make and use, their use has diminished in recent years due to environmental concerns regarding both the nickel itself and the solvents which must be used in those compositions.

Copper-based EMI-shielding and RFI-shielding coatings have been developed to address some of the problems associated with nickel-based coatings. Copper-based coatings are somewhat more expensive than nickel-based coatings, but higher conductivity may be obtained therewith. Either nickel- or copper-based coatings may be prepared with an aqueous carrier so that a low volatile organic content (VOC) may be obtained and certain environmental considerations may be mitigated. However, known copper-based coatings require caustic strippers, are very unstable (they oxidize in the can), and typically provide a poor suspension and poor color flow, etc.

A need therefore exists for an aqueous-based EMI-shielding and RFI-shielding coating composition with good strippability, stability, suspension, color flow, etc. The present invention addresses that need.

SUMMARY OF THE INVENTION

In one aspect of the invention there is provided an aqueous coating composition for shielding plastics against electromagnetic interference and radio frequency interference. The coating composition preferably includes:

(a) between about 7% and about 65% by weight of a thermoplastic aqueous emulsion;

(b) between about 1.5% and 10% by weight of an aqueous dispersion selected from the group consisting of urethane, alkyd, epoxy, polyester, and vinyl dispersions;

(c) between about 0.1% and 5% by weight of a coalescing solvent selected from the group consisting of glycol, alcohol, ketone, ester, aromatic and aliphatic coalescing solvents;

d) between about 0.1% and about 5.0% by weight of conductive clay or silica;

e) between about 0.01% and about 5.0% by weight of a polyacrylate resin;

f) particles of a conductive metal selected from the group consisting of copper, silver, nickel and gold, or mixtures thereof;

g) one or more defoaming agents; and h) water.

The inventive conductive coating compositions have a resistance of less than 1.0 ohms/square at a coating thickness of less than 1.5 mils, with a coating cohesion that passes the cohesive tape test for metallized coatings.

One object of the present invention is to provide a coating composition which may be sprayed onto plastic to provide EMI-and RFI-shielding properties.

Further objects and advantages of the present invention will be apparent from the following description.

DESCRIPTION OF THE PREFERRED EMBODIMENT

For the purpose of promoting an understanding of the principles of the invention, reference will now be made to preferred embodiments and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

As previously indicated, the present invention is an aqueous, conductive, coating composition. The composition provides excellent film properties, including conductivity, adhesion, cohesion, flexibility, environmental resistance, stability, anti-settling properties, strippability, mar-resistance, sag resistance, and film hardness during use.

In one embodiment the coating composition comprises a water soluble thermoplastic emulsion (more properly, a thermoplastic aqueous emulsion), an aqueous dispersion, a coalescing solvent, silver plated copper flakes, one or both of conductive clay or silica, polyacrylate resin, and a defoamer.

The thermoplastic water soluble emulsion may be an alkyd, epoxy, polyester or acrylic copolymer emulsion preferred emulsions include acrylics and modified acrylics, with styrenated acrylic emulsions being most preferred. Preferably, between about 7% and about 65% (by weight) of the thermoplastic water soluble emulsion is included in the formulation.

The aqueous dispersion is selected from the group consisting of urethane, alkyd, epoxy, polyester, and vinyl dispersions. Most preferably the aqueous dispersion is included in an amount of between about 1.5% to 10% by weight. The type and amount of aqueous dispersion is balanced with the type and amount of thermoplastic emulsion, thereby obtaining the desired balance of properties provided by each, as is generally known to persons skilled in the art.

Coalescing solvents are preferably used to promote film formation, to develop sufficient film integrity so that consistent film development is independent of atmospheric conditions, and to allow for variations in application equipment. Typical suitable coalescing solvents include glycols, alcohols, ketones, esters, aromatics, and aliphatic solvents. Glycol type coalescing solvents are most preferred, particularly: Glycol Ether EB, Butyl Cellosolve, 2-Butoxyethanol (2-BE), Ethylene Glycol Monobutyl Ether (EGBE), Diethylene Glycol Monobutyl Ether (Glycol Ether DB), Butoxydiethylene Glycol, Diethylene Glycol N-butyl Ether, Butyl Di-Glycol, Butyl Carbitol, (Glycol Ether PB) Propylene Glycol Monobutyl Ether, (Glycol Ether EP) Ethylene Glycol Ionopropyl Ether, 2-Propoxyethanol, (Glycol Ether PM) Propylene glycol Monomethyl Ether, Propylene Glycol and Ethylene Glycol. These or equivalent solvents may be used singularly or in combination, with amounts ranging from 2.5% to about 16% by weight.

A conductive metal is used in the invention to provide the desired shielding capability. Preferably the conductive metal includes flakes of copper, gold, nickel or silver, or alloys thereof. In the most preferred embodiments silver-plated copper metal flakes are used.

The average particle size of the metal can vary over a wide range, but is preferably in the range of from about 5 microns to about 75 microns. Most preferably, the metal is provided as flakes of about 25 microns to about 60 microns. If the mean particle size is less than about 5 microns the electrical properties may be adversely affected. In particular, if the metal particles are too fine, the resistivity of the composition may be too high. If the average particle size is greater than about 75 microns, the composition will not lend itself to thin film applications. In those cases the composition will have a coarse and rough appearance at thinner films and the exposed metal will have a greater risk for abrasion.

The inventive coatings also include between about 0.1% and about 5.0% by weight of conductive clay and/or silica Also, between 0.01% and about 5% by weight of a polyacrylate resin or associative thickener is preferably included. The conductive clay and/or silica and polyacrylate resin work together to improve coating cohesion, allowing the coating to pass the "cohesive tape test" for metallized coatings. With improved cohesion the coating not only sticks to the substrate to which it has been applied, but the metal flakes remain integrated in the coating and do not easily rub or flake off. The disassociation of metal from the applied coating has been a problem of prior art coatings.

As indicated above, in making the inventive coatings it is important to select the correct resin mixture, i.e., acrylic/alkyd, acrylic/polyurethane, so as to obtain the properties desired for a particular application. In general, the resins are blended based on theoretical weight solids to enhance the water resistance, humidity resistance and other physical properties of the coating formulation. The film formed is, therefore, tighter and more resistant to the elements. As a result, the properly formulated blend of resin protects the metal contained within the paint film and encapsulates it, while bonding the coating to the plastic. The blending of resins is generally known to the art and can be accomplished by skilled artisans without undue experimentation.

In addition to balancing the resins used in the coating, it is also necessary to incorporate the appropriate amounts of conductive clay, silica and polyacrylate, as well as to incorporate the appropriate amount of metal in the coating. The most preferred mixtures range from 15 to 25% on metal solids.

The blend of the various components will have several major effects on coatings adhesion, cohesion and attenuation. For example, the appropriate blend of components produces a stable formulation that allows for a major increase in binder to metal ratio. With proper blending a 50:50 metal-to-binder ratio can be extended to a 60:40 metal-to-binder ratio, or even a 70:30 metal-to--binder ratio, while still permitting a maximum binding of metal particulates within the coating film. It is important to note that, as the metal to resin ratios are lowered, an increase in the cohesive strength of the film to the metal is recognized. The lower resistance readings and lower film thickness requirements are not sacrificed, however, regardless of the ratio.

It is to be appreciated that other conventional components may be added to the conductive composition such as, but not limited to, defoaming agents, talcs, waxes, and silicones. Each of these additional components is preferably used in an amount of between about 0.02% and about 2.0%, by weight, of the composition.

The viscosity of the composition is ready for use with conventional spray equipment, but may be modified for other applications. The normal range is 20+/–5"#3 Zahn Cup.

The pH is preferably maintained in the range of about 7.0 to about 9.0. Most preferably a pH of about 7.5 to about 8.8 is maintained.

The compositions may be applied by a variety of spray techniques. Conventional or HVLP applications are the most commonly used techniques.

Once the conductive film coating is applied to a substrate, it is cured at room temperature for seven days, or force cured in an oven with the temperature set from 125° F.–400° F. for a time sufficient enough to provide for an accelerated cure and promote good adhesion to a substrate, without distorting the substrate.

The coating may be applied to any conventional rigid or moderately flexible substrate. In some preferred embodiments the substrate is a plastic polymer, most preferably a thermoplastic polymer, such as an acrylic, a polyester, a polycarbonate, a polystyrene, a polyvinyl chloride, an acrylonitrile-butadiene-styrene ("ABS"), a structural molded compound ("SMC") or a polyphenylene oxide ("PPO"), or blends those or similar polymers such as a blend of ABS and polycarbonate. As is known to the art, some substrates may have to be pretreated or precoated before applying a coating composition.

The inventive coatings provide superior conductivty at thin coating thicknesses, with a coating that is highly cohesive.

Reference will now be made to specific examples using the processes described above. It is to be understood that the examples are provided to more completely describe preferred embodiments, and that no limitation to the scope of the invention is intended thereby.

EXAMPLE 1

Preparation of an aqueous thin conductive film-forming composition using a copper plated silver flake.

| (Composition-Components) | Weight in parts per 100/wt. |
|---|---|
| Weigh in a container: | |
| acrylic emulsion[1] | 22.31 |
| defoamer[2] | .22 |
| aqueous urethane dispersion[3] | 3.72 |
| Pre-mix and add slowly to high speed vortex: | |
| ethylene glycol monobutyl ether[4] | 3.72 |
| diethylene glycol monobutyl ether[5] | 1.73 |
| Water | 7.89 |
| Add to above mix: | |
| Water | 22.57 |
| Pre-mix under agitation on a side mix for 30 minutes before adding back to above composition: | |
| Water | 9.21 |
| Conductive clay | 1.02 |
| Sift into vortex while mixing the above composition: | |
| Copper silver flake | 27.40 |
| Add to defoam: | |
| BYK 020 defoamer | .21 |
| The properties of the above composition are as follows: | |
| Weight/gallon | 11.39 |
| % Weight solids | 43.34 |
| % Volume solids | 21.61 |
| VOC | 2.29 |
| Coverage | 347 Sq. Ft. @ 1.0 mil no loss |
| Viscosity | 20 sec. #3 Zahn |
| pH | 7.8 |
| Conductivity | 0.35 OHMS/Sq @ 1.0 mil |
| Adhesion | ASTM 5B rating over tested substrates |

[1] e.g., Neocryl A-639
[2] e.g., Deefo 806-102
[3] e.g., Neorez R-966
[4] e.g., Butyl Cellosolve
[5] e.g., Butyl Carbitol

EXAMPLE 2

Preparation of another aqueous thin conductive film forming composition using a copper plated silver flake.

| Component | Parts per 100 |
|---|---|
| styrenated acrylic emulsion[6] | 22.31 |
| defoamer[7] | .22 |
| aqueous urethane dispersion[8] | 3.72 |
| Pre-mix and add slowly to high speed vortex: | |
| Propylene glycol monobutyl ether | 3.72 |
| Propylene glycol monomethyl ether | 1.73 |
| Water | 7.89 |
| Add to above mix: | |
| Water | 22.57 |
| Pre-mix under agitation on a side mix for 30 minutes before adding back to above composition: | |
| water | 9.21 |
| conductive clay | 1.02 |
| Sift into vortex while mixing above composition: | |
| Copper silver flake | 27.40 |
| Add to defoam: | |
| BYK 020 | .21 |
| The properties for the above composition are as follows: | |
| Weight/gallon | 11.39 |
| % weight solids | 43.34 |
| % volume solids | 21.61 |
| VOC | 2.29 |
| Coverage | 347 sq/ft @ 1.0 mil no loss |
| pH | 7.8 |
| Conductivity | Less than 0.5 ohms/sq @ 1.0 mil |
| Adhesion | ASTM 5B rating over tested substrates |

[6] e.g., Neocryl A-639
[7] e.g., Deefo 806-102
[8] e.g., Neorez R-966

EXAMPLE 3

| Composition-Components | Weight in Parts per 100/wt. |
|---|---|
| Weigh into a container: | |
| acrylic emulsion[9] | 22.31 |
| defoamer[10] | .22 |
| aqueous urethane dispersion[11] | 3.72 |
| Pre-mix and add slowly to high speed vortex: | |
| Butyl Cellosolve | 3.72 |
| Butyl Carbitol | 1.73 |
| Water | 8.63 |
| Add to above mix: | |
| Water | 22.57 |
| Pre-mix under agitation on a side mix for 30 minutes before adding back to above composition: | |
| Water | 9.21 |
| conductive clay | 1.02 |
| Sift into the vortex while mixing the above composition: | |
| Copper Silver Flake | 27.40 |
| Add to defoam: | |
| BYK 020 | .21 |
| The properties of the above composition are as follows: | |
| Weight/Gallon | 11.40 +/− 0.2 |
| % Weight Solids | 43.00 +/− 2.0 |
| % Volume Solids | 21.00 +/− 2.0 |
| VOC | 2.29 |
| Coverage | 347 Sq. Ft. @ 1.0 mil. - no loss |
| Viscosity | 15–20" #3 Zahn |
| pH | 8.5–8.8 |
| Conductivity | Less than 0.5 ohms/Sq. @ 1.0 mil. |
| Adhesion | ASTM 5B rating over tested substrates |

[9] e.g., Joncryl 537
[10] e.g., DEEFO 806-102
[11] e.g., Bayhdrol TPLS-2033

EXAMPLE 4

| Weigh into a poly-lined container next "4" items: | |
|---|---|
| Acrylic emulsion | 19.65 |
| Alkyd | 7.15 |
| Defoamer | .20 |
| Water | 7.51 |
| High speed mix next item smooth into above: | |
| Silica | 1.00 |
| Premix next "5" Add slowly to high speed vortex: | |
| Water | 14.60 |
| Acetone | 20.10 |
| Ethylene Glycol Monobutyl Ether | 2.68 |
| Diethylene Glycol Monobutyl Ether | .90 |
| Texanol Isobutyrate | .45 |
| Sift next item into batch: | |
| Copper Silver Flake | 11.16 |
| Premix next two add slowly to high speed vortex: | |
| Water | 1.34 |
| Polyacrylate resin | 1.34 |
| Add next item Slowly to vortex: | |
| Ammonia | .12 |
| Weight/gallon | 8.90 |
| % weight solids | 27.44 |
| % volume solids | 15.73 |
| VOC | 1.85 |
| Coverage: | 252 sq. ft. @ 1.0 mil with no loss |
| pH | 7.5–7.8 |
| Viscosity | 15–20" #3 Zahn |
| Conductivity | 0.35 ohms/square @ 1.0 mil |
| Adhesion | ASTM 5B rating on tested substrates |
| Cohesion | Scotch tape test shows -0- loss of metal flake |
| Metal to Binder | 50:50 |

EXAMPLE 5

| Weigh into a poly-lined container next "3" items: | |
|---|---|
| Acrylic emulsion | 24.68 |
| Defoamer | .24 |
| Polyurethane dispersion | 4.12 |
| Premix next "3" Add slowly to high speed vortex: | |
| Ethylene Glycol Monobutyl Ether | 4.12 |
| Diethylene Glycol Monobutyl Ether | 1.91 |
| Water | 8.73 |
| Add all of next item: | |
| Water | 24.96 |
| In a separate container, premix next "2" items for 30 minutes, then add the mixture to above: | |
| Water | 10.18 |
| Conductive clay | 1.13 |
| High speed mix next item into small amount of above, then add back to batch: | |
| Silica | 1.00 |
| Then add: | |
| Copper Silver Flake | 12.77 |
| Premix next "2" add slowly to high speed vortex: | |
| Water | .25 |
| Polyacrylate resin | .25 |
| Add last item to defoam: | |
| Defoamer | .23 |
| Weight/gallon | 9.61 |
| % weight solids | 29.29 |
| % volume solids | 17.59 |
| VOC | 2.45 |
| Coverage: | 282 sq. ft. @ 1.0 mil with no loss |
| pH | 7.5 |
| Viscosity | 30 +/− 5" #3 Zahn |
| Conductivity | Less than 0.5 ohms/square @ 1.0 mil |
| Adhesion | ASTM 5B rating on tested substrates |
| Cohesion | Scotch tape test shows -0- loss of metal flake |
| Metal to Binder | 50:50 |

EXAMPLE 6

| Weigh into a poly-lined container next "4" items: | |
|---|---|
| Acrylic emulsion | 19.65 |
| Alkyd | 7.15 |
| Defoamer | .20 |
| Water | 7.51 |
| High speed mix next item smooth into above: | |
| Silica | 1.00 |
| Premix next "5" Add slowly to high speed vortex: | |
| Water | 14.60 |
| Acetone | 20.10 |
| Ethylene Glycol Monobutyl Ether | 2.68 |
| Diethylene Glycol Monobutyl Ether | .90 |
| Texanol Isobutyrate | .45 |
| Sift next item into batch: | |
| Copper Silver Flake | 17.16 |
| Premix next two add slowly to high speed vortex: | |
| Water | 1.34 |
| Polyacrylate resin | 1.34 |
| Add next item slowly to vortex: | |
| Ammonia | .12 |
| Weight/gallon | 9.4 |
| % weight solids | 32.06 |
| % volume solids | 16.50 |
| VOC | 1.77 |
| Coverage: | 264 sq. ft. @ 1.0 mil with no loss |
| pH | 7.5–7.8 |
| Viscosity | 15–20" #3 Zahn |
| Conductivity | 0.20 ohms/square @ 1.0 mil |
| Adhesion | ASTM 5B rating on tested substrates |
| Cohesion | Scotch tape test shows -0- loss of metal flake |
| Metal to Binder | 60:50 |

EXAMPLE 7

| Weigh into a poly-lined container next "4" items: | |
|---|---|
| Acrylic emulsion | 19.65 |
| Alkyd | 7.15 |
| Defoamer | .20 |
| Water | 7.51 |
| High speed mix next item smooth into above: | |
| Silica | 1.00 |
| Premix next "5" Add slowly to high speed vortex: | |
| Water | 14.60 |
| Acetone | 20.10 |
| Ethylene Glycol Monobutyl Ether | 2.68 |
| Diethylene Glycol Monobutyl Ether | .90 |
| Texanol Isobutyrate | .45 |
| Sift next item into batch: | |
| Copper Silver Flake | 27.16 |
| Premix next two add slowly to high speed vortex: | |
| Water | 1.34 |
| Polyacrylate resin | 1.34 |
| Add next item slowly to vortex: | |
| Ammonia | .12 |
| Weight/gallon | 10.24 |
| % weight solids | 38.58 |
| % volume solids | 17.75 |
| VOC | 1.65 |
| Coverage: | 284 sq. ft. @ 1.0 mil with no loss |
| pH | 7.5–7.8 |
| Viscosity | 30" +/– 5 #3 Zahn |
| Conductivity | 0.15 ohms/square @ 1.0 mil |
| Adhesion | ASTM SB rating on tested substrates |
| Cohesion | Scotch tape test shows -0- loss of metal flake |
| Metal to Binder | 70:30 |

The inventive compositions are useful as highly conductive coatings which can be applied in thin films through a spray application. The effectiveness of the conductive film allows the composition to be useful at minimal film thickness, particularly in the range of 0.25 mils to 2.0 mils. This is a significant advantage over prior art compositions since irregular or unusual part geometries may make it difficult to achieve thick films in certain areas.

In certain preferred embodiments the coating is applied at thicknesses of less than 1.5 mils and provides a resistance (measure of conductivity) of less than 1 ohm per square. In the more preferred embodiments the coating is applied at thicknesses of less than 1.2 mils and provides a resistance of less than 0.5 ohms per square. In the most preferred embodiments the coating is applied at thicknesses of less than 1.0 mils and provides a resistance of less than about 0.25 ohms per square.

As indicated above, when the conductive clay, silica, and polyacrylate resin are properly balanced the coating not only has good conductivity at thin coating thicknesses, but the coating also has desirable cohesion properties that make it useful for commercial applications. For example, one such use of the coating is to shield plastic devices which contain electrical circuits or internal computer components that may be subjected to and require electromagnetic compatibility. To be acceptable for that use the coating must pass the cohesive tape test for metallized coatings, as set forth below.

Cohesive Tape Test for Metallized Coatings

This test method describes a technique by which a relative determination of the cohesive strength of metal particles, suspended or held within organic coatings, such as paint, varnish, adhesive and/or lacquer, can be determined when applied to smooth, flat surfaces.

General Method

Metal containing coatings under test are applied at uniform thickness to flat panels. After drying and curing the surface, in a method and a at a film thickness that is suitable and appropriate to the coating's physical requirements, the coating is then tested for cohesive properties by the application of an adhesive tape. First, the tape is rubbed down firmly over the coatings surface. After complete contact has been made by the adhesive tape to the surface of the film, the tape is then quickly pulled off, as is described in crosshatch adhesion tape test ASTM D3359 (06.01). The amount of metal particulates transferred to the adhesive tape is then reviewed and rated per the "Classification of Results".

Experimental Procedure

1) Select an area of the part, plaque or panel that is smooth and blemish free.
2) Cut a piece of adhesive tape 4" long
3) Use a rubber eraser and rub firmly the full length of the tape to ensure complete adhesive contact between the surface of the coating and the tape.
4) Allow approximately 30" before removing tape as described in ASTM D3359 (06.01).
5) Pull the tape quickly from the surface.
6) Apply the tape to an unlined white index card for later evaluations, and classification per Section 6.

Classification of Results

| Cohesion Rating | Result | Description of Testing |
|---|---|---|
| CO-5 | Excellent | No removal of metal particulates |
| CO-4 | Very good | Only traces of metal particles seen |
| CO-3 | Good | Few and scattered metal particulates |
| CO-2 | Poor | Moderately dense population of metal particulates |
| CO-1 | Failure | Dense complete removal of metal particulates |
| CO-0 | Failure | Film and particles are removed to the surface |

With the appropriate blend of silica, conductive clay and polyacrylate, enhanced cohesion properties are obtained by neatly networking each metal particulate. Then, as the networking is maximized, a lower metal loading can be employed. This in turn allows the binder concentration to be increase so that the metal particle can be more tightly held within the film. As a result, a cohesive force is applied to the surface of the particles by the resin, which leads to an increase in the total cohesive strength of the film. With this technique few to none of the metal particulates can be removed when an external force is applied, such as masking taping or manual abrasion.

Further, the inventive coatings are more resistant to humidity aging without loss of conductivity than are the coatings of the prior art. For example, prior art techniques are only able to maintain a 200% increase in resistance readings after 72 hours of humidity aging, and even then only by employing a 75:25 or a 85:15 metal to binder ratio. After humidity exposure for 72 hours, the coatings of the present invention changes a maximum of 100% with a 50:50 metal to binder blend, 25% with a 60:40 metal to binder blend and 0.0% with a 70:30 metal to binder blend.

To highlight the above, the coatings of examples 4, 6 and 7 above were tested after 72 hours of humidity aging. The results are shown in the table below.

TABLE 1

TEST RESULTS, EXAMPLES 4, 6 7

|  | FORMULA 1 | FORMULA 3 | FORMULA 4 |
|---|---|---|---|
| Substrate Coated: | ABS and Polystyrene | ABS and Polystyrene | ABS and Polystyrene |
| Film Thickness | 1.2 +/− 0.2 mils | 1.2 +/− 0.2 mils | 1.2 +/− 0.2 mils |
| Initial Ohms/Square Readings: | 0.4 | 0.23 | 0.15 |
| 72 hr. Humidity Aging Ohms/Square Readings: | 0.8 | 0.28 | 0.15 |
| Metal to Binder | 50:50 | 60:40 | 70:30 |

Finally, it is to be appreciated that the inventive coating is easily stripped from the substrate. This feature is unique to this group of coatings and provide a significant benefit since the coating can be removed from the substrate at any point in the product's life.

In particular, using a combination of provided chemicals the coating is easily lifted from a part in strips or sheets, rather than dissolving into a solution. The metal is accordingly held within the skin of the coating, rather than dissolving, preventing the metal from interacting with manufacturing equipment or chemicals in the washers or stripping solutions.

In addition, as the product is stripped in sheets, the manufacturer can easily collect the waste products by filtering through a relatively coarse filter. This further allows him to reuse the stripper or save it for a future operation. Any collected product can then he dried and disposed of as a solid waste.

While the invention has been described in detail in the foregoing description, the same is to be considered as illustrative and not restrictive in character, it being understood that only the preferred embodiment has been shown and described and that all changes and modifications that come within the spirit of the invention are desired to be protected.

We claim:

1. A method of providing EMI and/or RFI shielding to a plastic substrate, said method comprising coating the plastic substrate with a coating composition comprising:

(a) between about 7% and about 65% by weight of a thermoplastic aqueous emulsion;

(b) between about 1.5% and 10% by weight of an aqueous dispersion selected from the group consisting of urethane, alkyd, epoxy, polyester, and vinyl dispersions;

(c) between about 0.1% and 5% by weight of a coalescing solvent selected from the group consisting of glycol, alcohol, ketone, ester, aromatic and aliphatic solvents;

(d) between about 0.1% and about 5.0% by weight of conductive clay or silica;

(e) between about 0.01% and about 5.0% by weight of a polyacrylate resin; and (f) particles of a conductive metal selected from the group consisting of copper, silver, nickel and gold, or mixtures thereof; wherein said thermoplastic aqueous emulsion, said aqueous dispersion, said conductive clay or silica, and said polyacrylate are incorporated into the coating in amounts appropriate to provide a coating having a resistance of less than 1.0 ohms/square at a coating thickness of less than 1.5 mils.

2. The method of claim 1 wherein said thermoplastic aqueous emulsion, said aqueous dispersion, said conductive clay or silica, and said polyacrylate are incorporated into the coating in amounts appropriate to provide a coating having a resistance of less than 0.5 ohms/square at a coating thickness of less than 1.2 mils.

3. The method of claim 1 wherein said thermoplastic aqueous emulsion, said aqueous dispersion, said conductive clay or silica, and said polyacrylate are incorporated into the coating in amounts appropriate to provide a coating having a resistance of less than 0.25 ohms/square at a coating thickness of less than 1.0 mils.

4. The method of claim 1, wherein said thermoplastic aqueous emulsion, said aqueous dispersion, said conductive clay or silica, and said polyacrylate are incorporated into the coating in amounts appropriate to provide a coating having sufficient cohesion to ensure that few to none of the metal particulates are removed when procedures defined by ASTM D3359 are followed.

5. The method of claim 2, wherein said thermoplastic aqueous emulsion, said aqueous dispersion, said conductive clay or silica, and said polyacrylate are incorporated into the coating in amounts which are also appropriate to provide a coating having sufficient cohesion to ensure that few to none of the metal particulates are removed when procedures defined by ASTM D3359 are followed.

6. The method of claim 3, wherein said thermoplastic aqueous emulsion, said aqueous dispersion, said conductive clay or silica, and said polyacrylate are incorporated into the coating in amounts which are also appropriate to provide a coating having sufficient cohesion to ensure that few to none of the metal particulates are removed when procedures defined by ASTM D3359 are followed.

* * * * *

UNITED STATES PATENT AND TRADEMARK OFFICE
CERTIFICATE OF CORRECTION

PATENT NO. : 5,968,600
DATED : October 19, 1999
INVENTOR(S) : Derek A. DiLeo

It is certified that error appears in the above-indentified patent and that said Letters Patent is hereby corrected as shown below:

In Item 75 of the Title Page, please change "Lafayette" to --Mt. Morenci--.

In column 2, line 57, please change "emulsion preferred" to --emulsion. Preferred--.

In column 3, line 18, please change "Ionopropyl" to --Monopropyl--.

In column 3, line 19, please change "glycol" to --Glycol--.

In column 7, line 25, please change "Slowly" to --slowly--.

In column 9, line 34, please change "SB" to --5B--.

Signed and Sealed this

Twenty-fourth Day of April, 2001

Attest:

NICHOLAS P. GODICI

Attesting Officer

Acting Director of the United States Patent and Trademark Office